United States Patent
Bezrukov et al.

(10) Patent No.: US 8,122,346 B2
(45) Date of Patent: Feb. 21, 2012

(54) METHODS AND SYSTEMS FOR MERGING SOFTWARE-LEVEL OBJECTS WITH DOCUMENT-LEVEL OBJECTS IN A DOCUMENT PUBLISHING ENVIRONMENT

(75) Inventors: Vladislav Bezrukov, Sandhausen (DE); Nikhil Dhairyawan, Eppelheim (DE); Matthias Jensen, Walldorf (DE); Ilya Khandamirov, Sandhausen (DE); Christian Lieske, Wiesloch (DE); Andreas Hirche, Leutershausen (DE); Matthias Kammerer, Karlsruhe (DE)

(73) Assignee: SAP AG, Walldorf (DE)

( * ) Notice: Subject to any disclaimer, the term of this patent is extended or adjusted under 35 U.S.C. 154(b) by 1322 days.

(21) Appl. No.: 11/197,446

(22) Filed: Aug. 5, 2005

(65) Prior Publication Data

US 2007/0033213 A1     Feb. 8, 2007

(51) Int. Cl.
*G06F 17/00* (2006.01)
(52) U.S. Cl. ......... 715/253; 715/209; 715/234; 715/205
(58) Field of Classification Search .................. 715/234, 715/205, 209, 253
See application file for complete search history.

(56) References Cited

U.S. PATENT DOCUMENTS

| | | | |
|---|---|---|---|
| 5,857,188 A * | 1/1999 | Douglas ................................. | 1/1 |
| 6,078,924 A | 6/2000 | Ainsbury et al. | |
| 6,118,768 A * | 9/2000 | Bhatia et al. ................... | 370/254 |
| 6,341,290 B1 | 1/2002 | Lombardo et al. | |
| 6,356,920 B1 * | 3/2002 | Vandersluis ................... | 715/210 |
| 6,362,838 B1 | 3/2002 | Szlam et al. | |
| 6,370,544 B1 | 4/2002 | Krebs et al. | |
| 6,418,470 B2 * | 7/2002 | Blumenau ...................... | 709/224 |
| 6,486,897 B1 * | 11/2002 | Arrouye et al. ................ | 715/853 |
| 6,578,192 B1 * | 6/2003 | Boehme et al. ................ | 717/115 |
| 6,684,370 B1 * | 1/2004 | Sikorsky et al. .............. | 715/205 |
| 6,782,379 B2 | 8/2004 | Lee | |
| 6,792,431 B2 * | 9/2004 | Tamboli et al. ........................ | 1/1 |
| 6,854,120 B1 | 2/2005 | Lo et al. | |
| 6,901,403 B1 * | 5/2005 | Bata et al. .............................. | 1/1 |
| 6,907,564 B1 * | 6/2005 | Burchhardt et al. .......... | 715/210 |
| 7,207,001 B2 * | 4/2007 | Bailey et al. .................. | 715/234 |
| 7,225,222 B1 * | 5/2007 | Lu .................................. | 709/203 |
| 7,257,594 B2 * | 8/2007 | Tamboli et al. ........................ | 1/1 |

(Continued)

OTHER PUBLICATIONS

"Arbortext 5: Putting Business Users in Control: Easing the Pain of Implementation," 2004 Arbortext, Inc., pp. 1-28.

(Continued)

*Primary Examiner* — Doug Hutton, Jr.
*Assistant Examiner* — Benjamin Smith
(74) *Attorney, Agent, or Firm* — Finnegan, Henderson, Farabow, Garrett & Dunner, LLP (57) ABSTRACT

Methods and systems are disclosed for generating, managing, and publishing documents based on document level objects and software level objects. In one aspect, a method is provided for managing documents in a computing system environment. The method includes identifying a placeholder object included in a document having a document level object, the placeholder object having metadata corresponding to a software level object. Software level object content is identified in response to a query message and is included within a response to the query message. A format of the software level object content included in the response is transformed into a second format based on a second set of constraints, and merged in the document based on the placeholder object. An output document may be generated such that the transformed software level object content replaces the placeholder object in the output document.

16 Claims, 4 Drawing Sheets

U.S. PATENT DOCUMENTS

| | | | |
|---|---|---|---|
| 7,321,894 B2* | 1/2008 | Degtyar et al. | 1/1 |
| 7,483,879 B2* | 1/2009 | Chang et al. | 1/1 |
| 7,720,814 B2* | 5/2010 | Jones et al. | 707/640 |
| 7,849,419 B2* | 12/2010 | Tudor et al. | 715/821 |
| 2002/0046235 A1* | 4/2002 | Foy et al. | 709/203 |
| 2003/0014443 A1* | 1/2003 | Bernstein et al. | 707/513 |
| 2003/0014617 A1* | 1/2003 | Tamboli et al. | 713/1 |
| 2003/0071857 A1* | 4/2003 | Arrouye et al. | 345/853 |
| 2003/0191822 A1* | 10/2003 | Leighton et al. | 709/219 |
| 2003/0233445 A1* | 12/2003 | Levy et al. | 709/224 |
| 2004/0123238 A1* | 6/2004 | Hefetz et al. | 715/513 |
| 2004/0205694 A1* | 10/2004 | James et al. | 717/104 |
| 2004/0215635 A1* | 10/2004 | Chang et al. | 707/100 |
| 2004/0230605 A1* | 11/2004 | Tamboli et al. | 707/102 |
| 2005/0102313 A1* | 5/2005 | Levering et al. | 707/102 |
| 2005/0278475 A1* | 12/2005 | Karatal et al. | 711/100 |
| 2005/0289156 A1* | 12/2005 | Maryka et al. | 707/100 |
| 2005/0289160 A1* | 12/2005 | Ashwin et al. | 707/100 |
| 2006/0031223 A1* | 2/2006 | Dole | 707/10 |
| 2006/0069695 A1* | 3/2006 | Katsumata et al. | 707/101 |
| 2006/0143556 A1* | 6/2006 | Elkady | 715/500 |
| 2007/0011267 A1* | 1/2007 | Overton et al. | 709/217 |
| 2008/0140705 A1* | 6/2008 | Luo | 707/103 R |

OTHER PUBLICATIONS

Arbortext, Inc., Doculabs Marketfocus Report, "FileNET and Arbortext: A Joint Solution for Content Management," May 2002, Doculabs, Chicago, IL, pp. 1-15.

* cited by examiner

METHODS AND SYSTEMS FOR MERGING SOFTWARE-LEVEL OBJECTS WITH DOCUMENT-LEVEL OBJECTS IN A DOCUMENT PUBLISHING ENVIRONMENT

TECHNICAL FIELD

The present invention generally relates to document management systems and, more particularly, to systems and methods for merging software-level objects with document level objects in a document publishing environment.

BACKGROUND

The advent and growth of the World Wide Web and networking software enable private individuals and business personnel to access information from an increasing number of sources, such as web servers, database servers, enterprise systems, and other forms of information storage systems. The information provides data for certain business processes. Accordingly, businesses rely on systems and techniques that ensure the correct data is generated and displayed as content on a user's computer display device.

To ensure the consistency of displayed information, businesses continue to harness various technologies associated with distributed systems to develop and provide specialized services. One type of technology that is gaining popularity are web services designed for business processes. A business web service is system functionality that is accessible over the Internet, an Intranet, and even an Extranet, using standard web-based protocols (e.g., Hyper Text Transfer Protocol (HTTP)). Such services may provide content that is configured and published using description languages, such as Hyper Text Transfer Markup Language (HTML) and eXtensible Markup Language (XML) interfaces and messages. Accordingly, business process services are an ideal way for businesses to provide services in heterogeneous environments where a consumer of these services may be a user operating a desktop, an application program, or even another business process hosted on any number of different platforms.

Although service technologies allow businesses to publish and retrieve information through a network, the dynamic nature of business requires the information to be constantly updated. For example, a business that provides a product may offer a user manual for the product in the form of an electronic document (i.e., on-line user manual) provided on a Web page served by a Web server. Because the product may evolve into later versions, the business must in turn update the user manual. A simple update to the manual may require many changes to the content associated with the document. Further, problems may arise when different types of updates to the manual originate from different sub-entities of the business, such as a marketing division and a design and manufacturing division. Therefore, the business has to manage the changes originating from different sub-entities to ensure the document is created, edited, and published (e.g., served on the Web site) efficiently.

Accordingly, there is a need to for a mechanism that enables a business to create, edit, and manage document, and edit documents based on changes from different sources within or external to the business.

SUMMARY

Aspects of the present invention are directed to methods and systems for merging software level objects and document level objects of different formats into a common format for publishing the document with content associated with the software level objects. In one aspect of the present invention, a method is disclosed for managing documents in a computing system environment. The method may include identifying a placeholder object included in a document having a document level object, the placeholder object having metadata corresponding to a software level object. Further, the method includes generating a query message based on the placeholder object and identifying software level object content based on the query message. The software level object content may be in a first format based on a first set of constraints. The method may also include providing a response message including the software level object content and transforming the format of the software level object content included in the response message to a second format based on a second set of constraints. In one aspect, the document level object is configured in the second format. The transformed software level object content may be merged in the document based on the placeholder object in the document. Based on the transformed software level object, an output document may be generated such that the software level object content replaces the placeholder object in the output document.

In another aspect of the invention, a system is disclosed for managing documents including a processor system and a memory system for storing processes. In one aspect, the memory system may include a first process executed by the processor system to retrieve a document including a document level object and a placeholder object associated with metadata corresponding to a software level object and provide a query message identifying the metadata. The first process may also receive a response message including software level object content that is configured in a first format based on a first set of constraints. Further, the first process may transform the format of software level object content included in the response message to a second format based on a second set of constraints. In one aspect, the document level object is configured in the second format. The first process may also merge the software level object content and document level object into an output document. Additionally, the memory system may include a second process executed by the processor system to create the software level object and identify the software level object content based on the metadata identified by the query message. Further, the second process may provide the response message to the first process in response to the query message. The first process generates the output document based on the transformed software level object content and document level object such that the software level object content replaces the placeholder object in the output document.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, show certain aspects of the present invention and, together with the description, help explain some of the principles associated with the invention.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

Overview

Methods and systems consistent with certain aspects of the present invention manage the creation, modification, and publication of a document. In one aspect of the invention, a first process may manage the creation, modification, and publication of a document including document level objects (e.g., content, such as text, graphics, etc.) and one or more placeholder objects that are associated with a software level object maintained by a second process, such as an code element including object class definitions and executable methods of one or more computer programming languages, such as the Java programming language from Sun Microsystems, Inc. In one aspect, a document level object may represent an object including non-executable data, such as text, graphics, etc. In contrast, a software level object may represent an object including data that is executed by a computer process or is used by the computer process to execute other executable code. For example, a software level object may include class definition information, methods that may be invoked by software processes, and any other form of data that is used or executed by a software process. Software level objects may include metadata describing the data associated with the software level object.

In one aspect of the invention, the first process may be a content management software process executed by a computing system associated with a business entity that includes one or more business units. A business entity may represent an organization that performs business, such as a company that manufactures products, a corporation that manages information etc. A business unit may represent a division, group, etc. of the business entity. The one or more business units may execute the second process via the computing system or a second computing system.

In one aspect, the first process may extract information corresponding to a placeholder object in a document based on a software level object. To do so, the first process may analyze the placeholder object in the document to identify metadata associated with a software level object maintained by the second process. Content corresponding to the software level object is collected by the second process and provided to the first process where it is merged with other content included in the document. In one aspect, the first process may transform the software level object content into a common format with document level objects included in the document. The objects are then merged into the document such that the content corresponding to the software level object is inserted for content corresponding to the placeholder object. The document may then be formatted into an output document that is made available to one or more computing systems over a network or similar medium.

Accordingly, aspects of the present invention allow document level objects to be maintained and managed in a different process and/or format than software level objects. Methods and systems consistent with the present invention may work across independent processes to seamlessly integrate the objects to form information used for producing output documents for publishing, such as generating Hypertext Markup Language (HTML) data from transformed XML data obtained from the two different processes.

The foregoing discussion is intended to introduce and provide initial clarity for some of the aspects associated with the present invention. Further details of the above-mentioned functionality and additional aspects, features, and embodiments of the present invention are described below.

Exemplary System Environment

Figure 1:
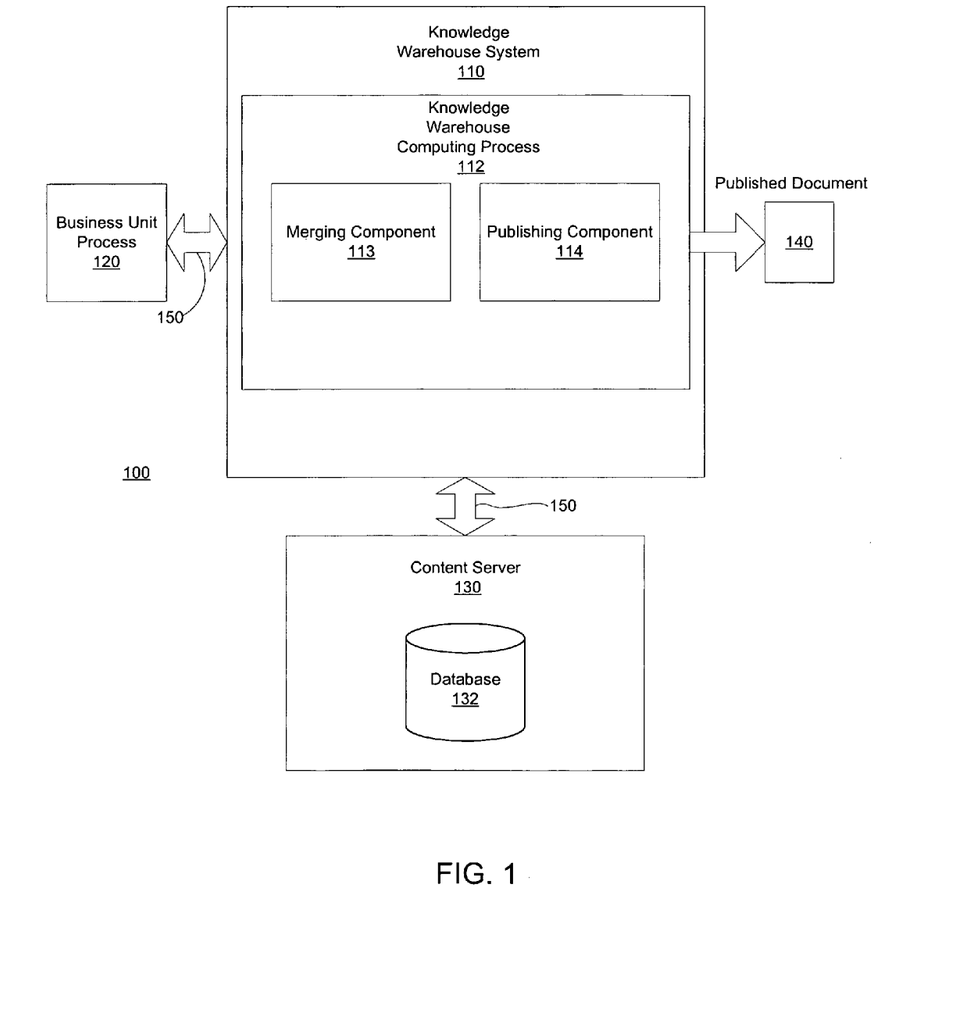
FIG. 1 illustrates a block diagram of an exemplary system environment consistent with certain aspects related to the present invention.

FIG. 1 illustrates a block diagram of an exemplary system environment 100 consistent with certain aspects related to the present invention. As shown, system environment 100 includes a content management system 110, a business unit process 120, and a content server 130.

Content management system 110 may be a computing system that performs content management for document creation, modification, and publication. A document may be an object, such as a shell document, that includes a combination of objects that may include data, such as content to be rendered in a user interface. For example, a document may be an XML formatted document representing a user manual for a software application that is provided by a business entity. Alternatively, the document may represent a Web page including content corresponding to one or more objects, such as an on-line user help page including one or more menu paths that a user may select for assistance in the form of information on selected topics. For instance, the Web page may include document level objects (e.g., Graphical User Interface (GUI) data (e.g., text, graphics, etc.) associated with the Web page or particular menu paths). As explained, document level objects may include non-executable data (e.g., content). Accordingly, the Web page may include document level objects, such as text or graphics that are not needed by any software processes to generate the Web page or collect its content for publication. Further, the exemplary Web page may include software level objects, such as the menu paths that direct a user browsing the page to selected information, graphics, addition software executed data, etc.

Due to the dynamic nature of Web page content, the menu paths, among other data, may be updated from time to time as the business entity refines the on-line help offered through the Web page. To facilitate the editing of the Web page, one or more placeholder objects may be created and placed in the Web page document. Each placeholder object may correspond to information that may change based on data associated with the placeholder object. To illustrate this example, consider a menu path included in the above described exemplary Web page. To update additional on-line help features, the menu path may require changes such that it directs a software process to one or more updated data and/or document or software level objects. To facilitate this updating, aspects of the present invention may implement a placeholder object with the menu path object that is used to direct a software process operating, for example, in content management system 110 to a software level object including content that corresponds to the menu path object. The software level object content may be generated, maintained, and updated by another software process and inserted in the document by content management system 110 in accordance with certain aspects related to the present invention.

Content management system 110 may include components consistent with computing systems, such as processors, memory, and input/output devices that enable documents to be created and edited via content management software that is executed by a processor. In one aspect, content management system 110 includes a content management process 112 that may be a software process executed by one or more processors. In one aspect, content management process 112 may include one or more processes that perform document management. The one or more processes may include merging component 113 and publishing component 114. Merging component 113 may be a process executed by a processor and configured to receive information, such as content corresponding to a placeholder object included in a document. Further, merging component 113 may merge that information with the content existing in the document in accordance with certain aspects of the present invention described below.

Publishing component 114 may be a process executed by a processor and configured to produce an output document that is formatted for publishing based on the merging functions performed by merging component 113. Publishing component 114 may implement document processes that analyze the requirements, constraints, and definitions of objects to generate the output document. For example, publishing component 114 may convert the document content into HTML content based on XML description data corresponding to the document. Once the output document is generated, publishing component 114 may then generate a published document 140 from the output document. Published document 140 may be, for example, an electronic document that is accessible by one or more computing systems (not shown). For instance, published document 140 may represent a Portable Document Format (PDF) document that is served on a Web page and accessible over the Internet by a user operating a computing system with a Web browser. In alternative aspects of the present invention, output document may be provided to a remote publishing system (not shown) that converts the output document into published document 140.

Business unit process 120 may be a software process executed by a processor. In one aspect, business unit process 120 may be a process executed by one or more computing systems operated by a business unit of a business entity. Although aspects of the present invention describe business unit process 120 in this manner, it should be noted that business unit process 120 is not restricted to being associated with a business unit or any particular business entity. Indeed, business unit process 120 may be a process performed by a processor implemented by a computing system that is affiliated or not affiliated with a business. Further, business unit process 120 may be implemented within content management system 110. In one aspect of the invention, business unit process 120 may create and modify software-level objects. A software level object may refer to an object including data (e.g., content such as button text of a GUI represented in a properties file) and metadata describing the data. Business unit process 120 may be configured to identify, integrate, and analyze disparate business data from heterogeneous sources, such as other business sub-entities of the business entity, and provide software level objects (e.g., content describing a different version of a product described in a user manual document created and managed through content management system 110).

In accordance with certain aspects of the invention, a user operating a computer system implementing business unit process 120 may generate one or more software level objects for use in association with the document level objects corresponding to a document maintained by either content server 130 and/or content management system 110. The software level objects may be updated by business unit process 120 without affecting the format and description of the document level objects managed by content server 130 and/or content management system 110. In some instances, however, configuration settings associated with the software level objects may require adjustment based on the updates to the software level objects. For example, an update to a software level object may be stored in a repository location different from the original software level object (e.g., unchanged version). Accordingly, configuration settings must be updated to ensure direct content management system 110 is directed to the repository storing the updated object.

Content server 130 may be one or more computing systems that manages and provides data used by content management system 110 to provide published document 140. Content server 130 may include one or more databases 132 that store the data served by content server 130. For example, database 132 may store document information, such as content and placeholder objects, that are used by content management system 130 for generating and publishing document 140. Further, content server 130 may provide document format information used by content management system 110 to publish document 140, such as XML style sheets, document level object information, etc. Content server 130 may also be software processes executed by one or more processes FIG. 1 also shows interconnections 150 between content management system 110 and business unit process 110 and content server 130. Interconnections 150 may each be one or more communication networks that facilitate communications between the components of computing environment 100. Based on the configuration of environment 100, interconnections 150 may include one or more of an Extranet, an Intranet, the Internet, a Local Area Network (LAN), public switch telephone network, Integrated Services Digital Network (ISDN), radio links, Global System for Mobile Communication (GSM), and any other form of wired or wireless communication networks. Accordingly, each of interconnections 150 may be compatible with any type of communication protocol used by the components of environment 100 to exchange information, such as Transmission Control/Internet Protocol (TCP/IP), Hypertext Transfer Protocol (HTTP), Wireless Application Protocol (WAP), XML, Wireless Markup Language (WML), etc.

Although FIG. 1 shows business unit process 120, content management system 110, and content server 130 as separate entities, aspects of the present invention may be implemented by a single computing system executing business unit process 120, content management process 112, and server processes consistent with the functions performed by content server 130.

Generating a Document for Publication

Figure 2:
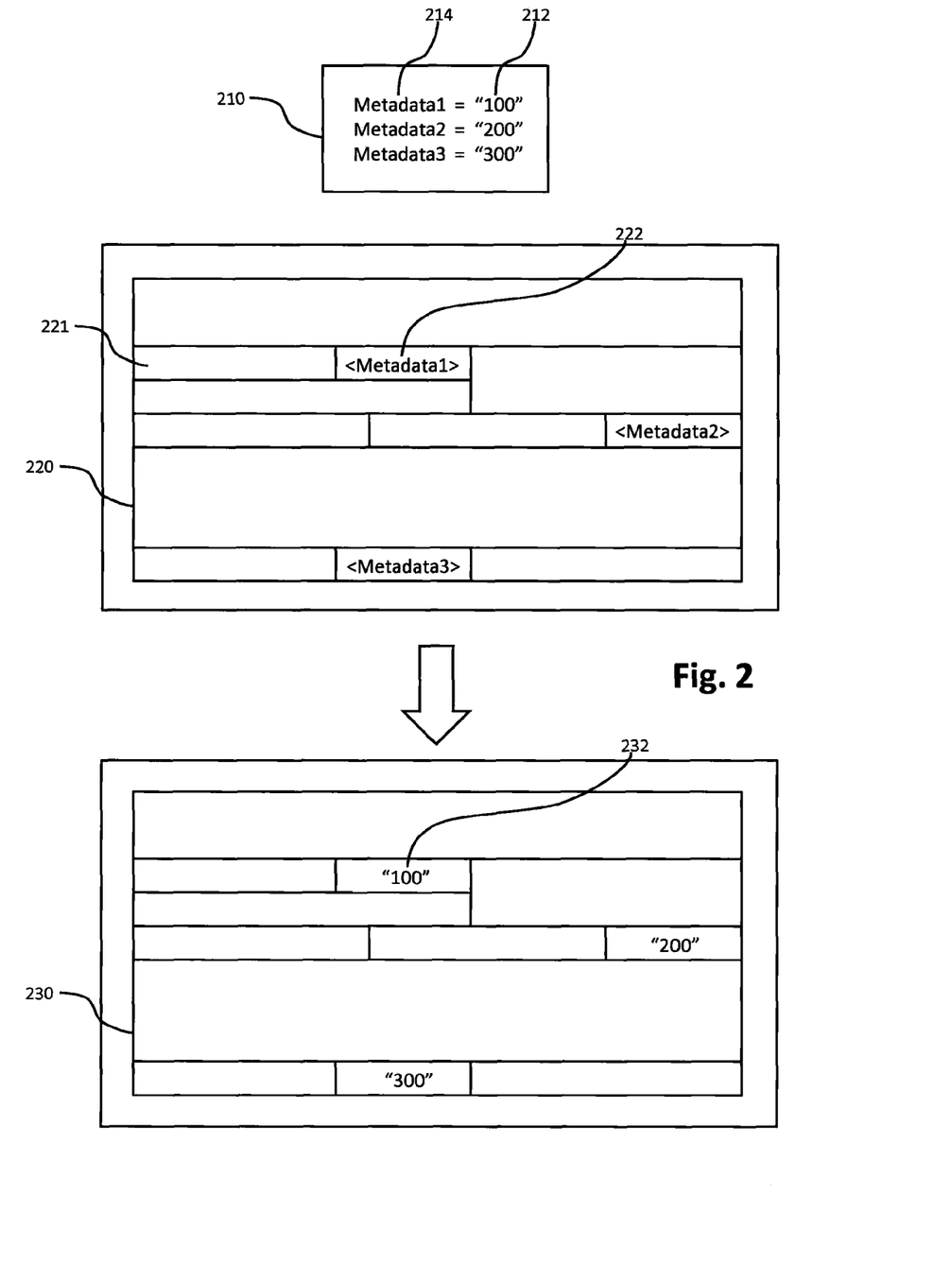
FIG. 2 illustrates a block diagram of exemplary objects and an output document consistent with certain aspects related to the present invention.

As explained, aspects of the present invention enable content management system 110 to generate an output document based on document level objects managed by a first process and software level objects managed by a second process. To better illustrate these aspects of the present invention, FIG. 2 shows a block diagram of a software level object 210, a document level object 220, and an output document 230. As shown, software level object 210 may include content 212, such as data (e.g., executable code, etc.) associated with a menu path of a Web page document. Software level object 210 may also include metadata 214 that corresponds to content 212. Document level object 220 may include content 221 that may reflect data that is included in a document. Content 221 may reflect fixed data that is not intended to change when the document is updated, although content 221 may be updated through document formatting techniques, such as XML editing processes performed by content management system 110. For example, content 221 may include data describing a class of products that a business entity provides. As shown, content 221 may be associated with a placeholder object 222 that reflects a portion of document level object 220 that is associated with data that is not maintained within the document and may be remotely updated. Placeholder object 222 may be configured with metadata information that corresponds to metadata 214 of software level object 210. For instance, placeholder object 222 includes "<metadata1>" that corresponds to "Metadata1" 214 of software level object 210. Aspects of the present invention leverage the use of placeholder object 222 in document level object 221 to produce output document 230. In one aspect, output document 230 shows the result of merging component 113 merging software level object content 212 with document level object 220 based on metadata 214 and placeholder object 222. For example, output document 230 includes the data "100" in placeholder object portion 232 that corresponds to placeholder object 222 and metadata1.

Although software level object 210 and document level object 220 are shown with multiple content, metadata, and/or placeholder objects, aspects of the present invention may implement software level objects that include a single content 212 and corresponding metadata 214 and document level objects that include a single content 221 and corresponding placeholder object 222.

Figure 3:
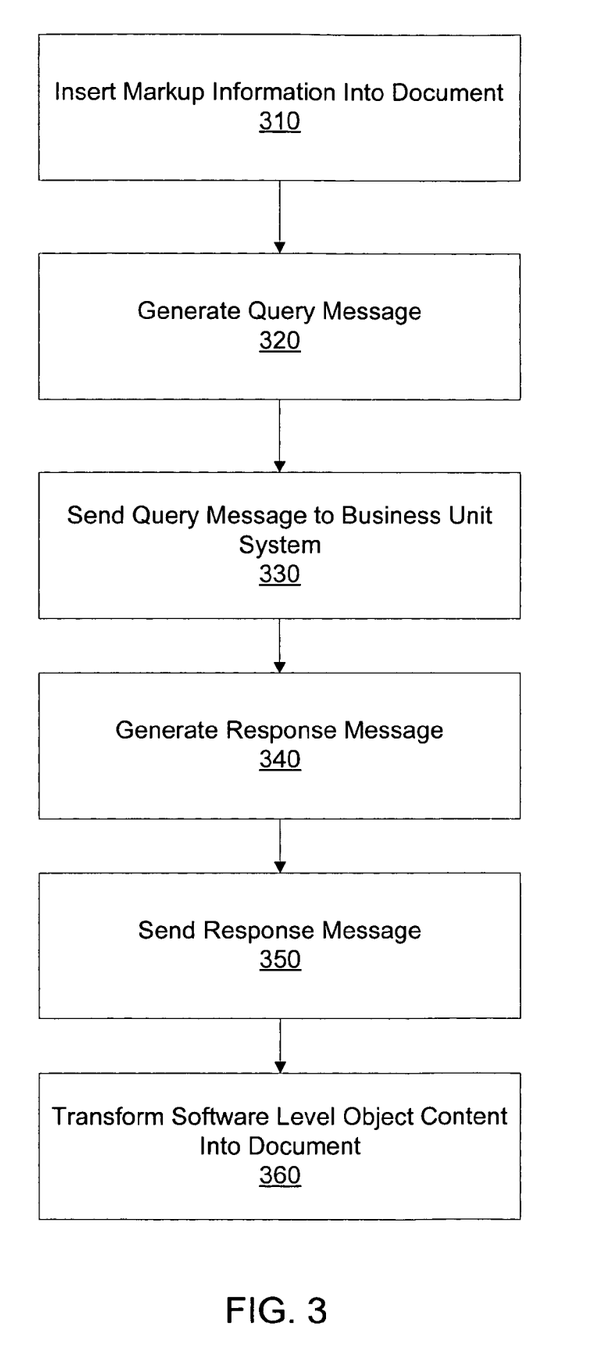
FIG. 3 illustrates a flowchart of an exemplary document management process consistent with certain aspects related to the present invention.

FIG. 3 shows a flowchart of an exemplary document management process performed by components of system environment 100 consistent with certain aspects related to the present invention. Initially, a user may operate a computer system that implements content management process 110 and executes software processes for generating and editing documents in a source format, such as a document description language format (e.g., XML). Leveraging the software processes, the user may generate and insert document markup information (e.g., XML description data) into a first document (Step 310). The functional markup information may include content reflecting data that is included in the first document, such as text for a user manual. Further, the markup information may include one or more placeholder objects, each representing data that may change, such as a version of a product described by the text in the user manual, part numbers, etc. A placeholder object may include metadata that describes or identifies a repository of a corresponding software level object.

In certain aspects, the user providing the one or more placeholder objects may not have knowledge of the source of content associated with these placeholder objects. Rather, the user may simply know what kind of content the placeholder object represents. For example, the user may insert a placeholder object representing content associated with a menu path on a Web page. In this example, the user does not know where the actual content associated with the menu path is located, only that the user wants the document to include content describing the appropriate information corresponding to the menu path in a particular location on the document. Content management process 120 may be configured to process the one or more placeholder objects to identify metadata corresponding to one or more software level objects that host the appropriate content for each of the one or more placeholder objects.

Additionally, content management process 120 may generate format information associated with the first document and based on the markup information generated by the user. The format information may include a document definition including an XML vocabulary describing certain features associated with the functional markup information for the document. The document, along with its functional markup information and format information, may be provided to and stored in database 132 managed by content server 130.

In one aspect, content management system 110 may receive a request to publish the first document. As noted, the first document includes content and one or more placeholder objects. The placeholder objects may not be configured in a format to produce content, but rather includes metadata associated with corresponding software level objects managed by business unit process 120. Accordingly, content management process 112 may retrieve the document markup information associated with the first document from content server 130. Further, business unit process 120 may identify a placeholder object that may be included in the first document and use the metadata in a placeholder object to generate a query message for obtaining the content corresponding to the placeholder object (Step 320). Content management process 112 may then send the query message to business unit process 120 (Step 330). In certain aspects of the present invention, content management system 110 formats the query message to include user supplied information and/or configuration information. User supplied information may include, for example, a technical name of the content associated with the software level object content corresponding to the placeholder object. Configuration information may include an identifier of a repository of the software level object. In one aspect, the configuration information may correspond to the metadata of the placeholder object.

In response to the query message, business unit process 120 uses the metadata to identify a software level object associated with one or more placeholder objects. In one aspect, business unit process 120 may use the configuration information included in the query message and metadata to determine which repository or system should be accessed to retrieve the requested software level object. Additionally, business unit process 120 may use the configuration information in the query message to determine what document description language, computer programming language, protocol, etc., should be used to access the software level object. For instance, by using the metadata associated with each placeholder object, business unit process 120 can locate a repository storing a particular software level object corresponding to a placeholder object in the first document and associated with the query message. Based on the identification, business unit process 120 may collect and insert the appropriate the software level object content into a response message. Once business unit process 120 collects the software level object content corresponding to the placeholder objects associated with the query message, it may insert the content into a response message (Step 340). Alternatively, business unit process 120 may generate a response message for each placeholder object associated with a separate query message sent by content management system 110. Thus, the response message may include the software level object content corresponding to each one of the placeholder objects included in the document. In certain aspects, business unit process 120 formats the response message into an XML stream, such as a SOAP message including an XML serialized representation of the software level object. Once generated, business unit process 120 sends the response message to content management system 110 (Step 350). Once the response message is received, content management process 120 leverages merging component 113 to perform a transformation process that transforms the software level object content and merges the content into the first document in accordance with certain aspects of the present invention (Step 360).

Figure 4:
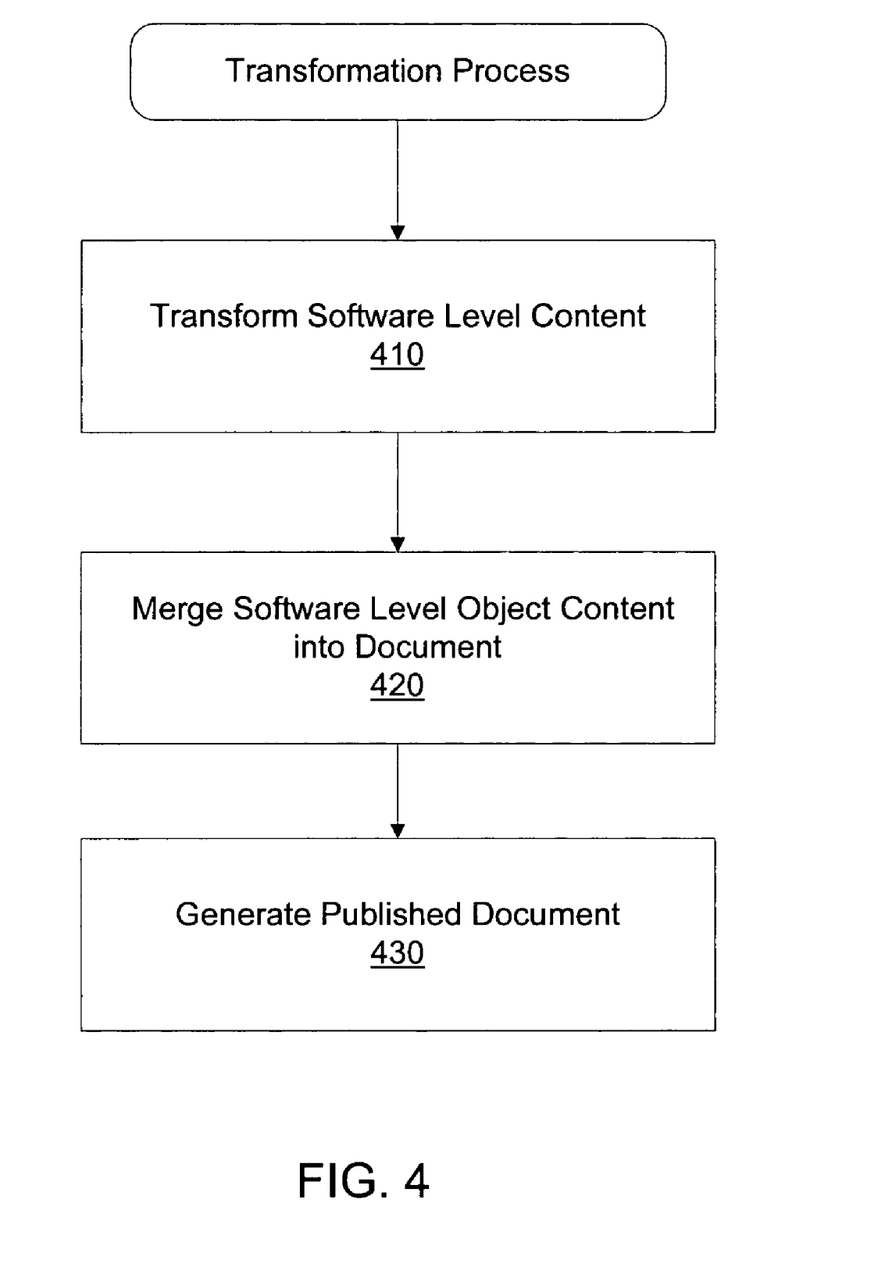
FIG. 4 illustrates a flowchart of an exemplary transformation process consistent with certain aspects related to the present invention.

FIG. 4 shows a flowchart of an exemplary transformation process consistent with these aspects related to the present invention. The transformation process may include transforming the software level object content included in the response message provided by business unit process 120. (Step 410). In certain aspects of the present invention, this transforming may include generating an instance of the software level object content that follows a first set of document constraints, such as a new XML vocabulary associated with the software level object content. Document constraints, such as an XML vocabulary, may refer to element specifications for a document. For example, a set of constraints (e.g., an XML vocabulary) may refer to a Document Type Definition (DTD). Document constraints may also may define document types for some or all of a document. Thus, a new XML vocabulary corresponding to the XML stream provided by business unit process 120 may define document type definition data corresponding to the software level object content for each of the placeholder objects. The first set of document constraints (e.g., the new XML vocabulary) may be different from a second set of document constraints (e.g., a second XML vocabulary) associated with the document level objects corresponding to the content included in the first document.

For example, the XML stream may include software-oriented XML data having a first format, such as an XML format similar to the format of software level object content. For instance, the software level object information included in the XML stream may include XML software elements, such as a property or identifier name corresponding to the software level object content. A document-level object may be configured in a second format that is different from the first format, such as an XML format that is content oriented, meaning the object may include provisions for tables, lists, etc. Accordingly, aspects of the present invention perform a transformation process that transforms the first formatted software level object content (e.g., software-level object XML format) into the second format (e.g., new vocabulary) corresponding to the document-level objects (e.g., document-level object XML).

In certain aspects of the invention, content management system 110 may transform the format of the instance of the software level object content such that it follows the same set of constraints as followed by the document level objects in the document. For example, content management system 110 may convert the software level object content from following a first XML vocabulary associated with the software level object maintained by business unit system 120 to following a second XML vocabulary followed by the document level objects in the document.

In one aspect of the invention, merging component 113 may collect the content corresponding to the one or more placeholder objects and merges the content into the document. (Step 420). In one aspect, merging component 113 may generate an output document by inserting the software level object content into portions of the first document associated with the corresponding placeholder object. Thus, the software level object content may replace the placeholder content in the output document. Alternatively, the software level object content may enrich the placeholder content by providing additional information or software code that is used in conjunction with information or code included in the placeholder object.

Merging component 113 may provide the output document to publishing component 114 for formatting into a published document. Publishing component 114 may format the first document according to the format information associated with the first document (e.g., style sheet data, XML vocabularies corresponding to the software level object content and the document level object content, etc.) into a published document 140 (Step 430). Once formatting is complete, content management system 110 may then make published document 140 available to other computing systems using one or more types of electronic publishing delivery mechanisms, such as Web service processes, providing the document over a network to requesting entities, etc.

In accordance with certain aspects of the present invention, content management process 120 may transform the format of a software level object content into a format common to document level objects for publication. For example, the native format of a software level object may be different from the format of a document level object. Accordingly, during the transformation process, merging component 113 may transform the software level object content into a first format, such as an XML Localization Information File Format (XLIFF) that is a format type intended to be understood by other processes and providers of information. From this format, merging component 113 may convert the first formatted software-level object content into an exchange-oriented format. For example, merging component 113 may insert the XLIFF formatted objects into particular bit locations of an Information and Content Exchange (ICE) data. Based on the exchange-oriented format, merging component 113 may convert the exchange-oriented formatted data to a format suitable for merging the data in to the document. For example, merging component 113 and/or publishing component 114 may convert the software level object content into HTML formatted data. It should be noted that the above types of formats are exemplary. Methods and systems consistent with certain aspects of the present invention may implement various types of formats for the software level object content and document level object content, as well as the intermediary formats used to convert this information into a common format for publication in a published document.

Aspects of the present invention also allow the software level object content managed by business unit process 120 to be updated without affecting the document level object content and documents managed by content management system 110. For example, a user may leverage business unit process 120 to modify the content of a software level object. When content management system 110 provides a query message with metadata associated with the modified software level object content, the modified content is sent in the response message. Accordingly, when the software level object content is merged with document level object content in an output document, the modified software level object content is included in the output document generated by merging component 113 and in the published document provided by publishing component 114.

CONCLUSION

The above described user interfaces are exemplary and are not intended to be limiting. For purposes of explanation only, certain aspects of the present invention are described herein with reference to the components illustrated in FIG. 1. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments. For example, aspects of the present invention may configure content management system 110 to include a software process that dynamically generates a placeholder object. For instance, the software process may execute a content search tool that locates names of software level object content that may be included in the document and automatically generates a placeholder object for the corresponding software level object.

Further, the sequences of steps described in FIGS. 3 and 4 are exemplary and not intended to be limiting. Thus, other method steps may be used, and even with the methods depicted in FIGS. 3 and 4 the particular order of events may vary without departing from the scope of the present invention. Moreover, certain steps may not be present and additional steps may be implemented in FIGS. 3 and 4. Also, the processes described herein are not inherently related to any particular apparatus and may be implemented by any suitable combination of components.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method for managing documents in a computing system environment, comprising:
    identifying a placeholder object included in a document having a document-level object, the document-level object being configured in a first format associated with a first set of constraints, and the placeholder object having metadata corresponding to a software-level object, the metadata comprising an identifier of a first repository associated with the software-level object, wherein:
        a first process executed by a processor manages the document-level object; and
        a second process executed by the processor maintains the software-level object;
    generating, by the first process, a query message based on the placeholder object, the query message comprising the identifier;
    receiving, by a first process, a response to the generated query message from the second process, the response comprising software-level object content associated with the software-level object, the software-level object content being in a second format associated with a second set of constraints;
    transforming, by the first process, the second format of the software-level object content included in the response to the first format of the document-level object;
    merging, by the first process, the transformed software-level object content in the document, based on the placeholder object in the document; and
    generating, by the first process, an output document based on the transformed software-level object content and the document-level object, such that the software-level object content replaces the placeholder object in the output document.

2. The method of claim 1, wherein generating the query message includes:
    inserting, based on the placeholder object, configuration information in the query message.

3. The method of claim 1, wherein the response comprises an XML stream of data.

4. The method of claim 1, wherein the generating step is performed by the first process, and the method further comprises:
    providing, by the second process, the response comprising the software-level object content to the first process.

5. The method of claim 4, wherein the software-level object content includes executable code that is modifiable by the second process.

6. The method of claim 1, wherein the merging step is performed by the first process, and the method further includes:
    modifying, by the second process, the software-level object content;
    receiving, by the second process, a second query message that includes the metadata associated with the software-level object; and
    providing, by the second process, the modified software-level object content to the first process in a second response message, such that the first process merges the modified software-level object content and the document-level object into the document.

7. The method of claim 6, wherein the second query message includes configuration information that identifies the first repository, and wherein providing the modified software-level object content further includes:
    collecting the modified software-level object content from the first repository; and
    storing the unmodified software-level object content in a second repository.

8. A system for managing documents, comprising:
    a processor; and
    a memory storing instructions that, when executed by the processor, cause the processor to perform:
        a first process to:
            retrieve a document including a document-level object and a placeholder object associated with metadata corresponding to a software-level object, the document-level object being configured in a first format associated with a first set of constraints, the metadata comprising an identifier of a first repository associated with the software-level object, wherein:
                a first process executed by a processor maintains the document-level object; and
                a second process executed by the processor maintains the software-level object;
            provide a query message identifying the metadata, the query message comprising the identifier;
            receive a response message to the generated query message including software-level object content having a second format associated with a second set of constraints;
            transform the second format of software-level object content included in the response message to the first format of the document-level object; and
            merge the software-level object content and document-level object into an output document; and
        a second process to:
            create the software level object;
            locate the first repository based on at least the identifier;
            identify the software-level object content based on at least the metadata; and provide the response message to the first process in response to the query message, wherein the first process generates the output document based on the transformed software-level object content and the document-level object, such that the software-level object content replaces the placeholder object in the output document.

9. The system of claim 8, wherein the second process maintains the software-level object in the first repository.

10. The system of claim 8, wherein the first process generates the query by inserting, based on the placeholder object, configuration information in the query message.

11. The system of claim 8, wherein the second process provides the response message by collecting the software-level object content from the first repository and inserting the software-level object content in the response message.

12. The system of claim 8, wherein the second process provides the response message as an XML stream of data.

13. The system of claim 8, wherein the software-level object content includes executable code that is modifiable by the second process.

14. The system of claim 13, wherein the first process is configured to generate the output document based on the executable code included in the software-level object content and without the document-level object.

15. The system of claim 8, wherein the second process modifies the software-level object content, receives second query message that includes the metadata associated with the software-level object, and provides the modified software-level object content to the first process in a second response message.

16. The system of claim 15, wherein the first process merges the modified software-level content and the document-level object into the output document, such that the modified software-level object content replaces the placeholder object in the output document.

* * * * *